(12) United States Patent
Lin et al.

(10) Patent No.: US 6,999,894 B2
(45) Date of Patent: Feb. 14, 2006

(54) METHOD AND DEVICE FOR MONITORING

(75) Inventors: Yao-Nan Lin, Keelung (TW);
Shang-Chih Yang, ChangHua (TW);
Kai-Yang Wang, Taipei (TW);
Chiung-Yueh Chang, Taipei (TW)

(73) Assignee: Micro-Star Intl. Co., Ltd., Taipei Hsien (TW)

( * ) Notice: Subject to any disclaimer, the term of this patent is extended or adjusted under 35 U.S.C. 154(b) by 152 days.

(21) Appl. No.: 10/721,282

(22) Filed: Nov. 26, 2003

(65) Prior Publication Data

US 2005/0060122 A1    Mar. 17, 2005

(30) Foreign Application Priority Data

Sep. 12, 2003    (TW) .............................. 92125134 A

(51) Int. Cl.
*G06F 15/00* (2006.01)
*H05K 7/20* (2006.01)
(52) U.S. Cl. ...................................... 702/179; 361/719
(58) Field of Classification Search ................ 702/179; 345/519, 520; 700/301; 361/695, 719
See application file for complete search history.

(56) References Cited

U.S. PATENT DOCUMENTS

| | | | | | |
|---|---|---|---|---|---|
| 5,485,625 | A | * | 1/1996 | Gumkowski | 713/323 |
| 5,767,896 | A | * | 6/1998 | Nemirofsky | 725/23 |
| 5,793,608 | A | * | 8/1998 | Winick et al. | 361/695 |
| 6,023,413 | A | * | 2/2000 | Umezawa | 361/697 |
| 6,106,566 | A | * | 8/2000 | Klein | 703/27 |
| 6,157,538 | A | * | 12/2000 | Ali et al. | 361/704 |
| 6,167,538 | A | * | 12/2000 | Neufeld et al. | 714/47 |
| 6,452,797 | B1 | * | 9/2002 | Konstad | 361/695 |
| 6,545,438 | B1 | * | 4/2003 | Mays, II | 318/254 |
| 6,590,572 | B1 | * | 7/2003 | Hoffert et al. | 345/213 |
| 6,671,177 | B1 | * | 12/2003 | Han | 361/719 |
| 6,760,649 | B1 | * | 7/2004 | Cohen | 700/299 |
| 6,851,064 | B1 | * | 2/2005 | Ku et al. | 713/300 |

OTHER PUBLICATIONS

Yu et al., Thermal Design of a Desktop Computer System Using CFD Analysis, 2001 IEEE, 17th IEEE Semi-Therm Symposium, pp. 18-26.*

* cited by examiner

Primary Examiner—Bryan Bui
Assistant Examiner—Toan M. Le
(74) Attorney, Agent, or Firm—Troxell Law Office, PLLC

(57) ABSTRACT

The present invention provides a device and a method for monitoring a component arranged inside a computer. The monitoring device includes: a detection unit, an I²C bus, a display panel, a processor, and a regulation unit. The detection unit is used for detecting and acquiring the information of operation statuses of components inside the computer. The I²C bus coupled to the detection unit is used for transmitting the forgoing detected information. The display panel arrange at a shell of the computer is used for displaying the foregoing information. The processor will receive the information from the I²C bus and thereby display the received information on the display panel. The regulation unit will issue a first control signal to the processor for requiring the processor to regulate the operation status of a component arranged inside the computer, and the processor will issue a second control signal to the detection unit through the I²C bus according the first control signal so as to regulate the operation status of a component arranged inside the computer.

11 Claims, 6 Drawing Sheets

METHOD AND DEVICE FOR MONITORING

BACKGROUND OF THE INVENTION (a). Field of the Invention

The present invention relates to a method and a device for monitoring, and more particularly, to a monitoring method and device capable of inspecting and controlling components inside a computer externally (b). Description of the Prior Arts Conventionally, when a computer is being used, there is no way for the user to know what is going on inside the computer. In order to provide users with more information about the operation statuses of components inside the computer, a monitor card is usually being used in the computer of prior arts for monitoring computer status, such as voltage abnormal of power source, processor overheating, etc., and showing the corresponding messages detected using guard lamps or display device (e.g. display panel) such that the users can acquire the information and react accordingly.

In the R.O.C Appl. No. 89123784, a monitoring device 30 (as shown in FIG. 1 of the present invention, also is referred in the aforesaid R.O.C. patent as FIG. 4) arranged in the recess located on a standard computer panel is provided. However, the foregoing monitoring device 30 can only detect the temperature inside the shell of the computer 32, and has no way to detect the operation statuses of the components inside the computer 32, not to mention to be able to regulate the defected operation statuses externally. In this regard, the present invention provides a monitoring method and device for improving the aforesaid shortcomings such that a user can detect the operation statuses of components inside a computer from outside, and further can regulate the operation statuses directly by an external panel.

SUMMARY OF THE INVENTION

The primary object of the present invention is to provide a monitoring device and method for inspecting the operation statuses of components arranged inside the computer externally.

The monitoring device comprises: a detection unit, an $I^2C$ bus, a display panel, a processor, and a regulation unit. The detection unit is used for detecting and acquiring the information of operation statuses of components inside the computer. The $I^2C$ bus coupled to the detection unit is used for transmitting the forgoing detected information. The display panel arrange at a shell of the computer is used for displaying the foregoing information. The processor will receive the information from the $I^2C$ bus and thereby display the received information on the display panel. The regulation unit will issue a first control signal to the processor for requiring the processor to regulate the operation status of a component arranged inside the computer, and the processor will issue a second control signal to the detection unit through the $I^2C$ bus according to the first control signal so as to regulate the operation status of a component arranged inside the computer.

The monitoring method comprises the steps of:
- using a detection unit for detecting and acquiring the information of operation statuses of components inside a computer;
- using an $I^2C$ bus for transmitting the forgoing detected information to a display panel arranged at a shell of the computer;
- using a regulation unit arranged at the display panel to issue a control signal to the detection unit through the $I^2C$ bus for regulating the operation status of a component inside the computer;
- using the regulation unit to define a critical range of the aforesaid information;
- evaluating whether the acquired information had exceeded the critical range and generating an alert signal shown on the display panel if the acquired information exceed the critical range.

Other and further features, advantages and benefits of the invention will become apparent in the following description taken in conjunction with the following drawings. It is to be understood that the foregoing general description and following detailed description are exemplary and explanatory but are not to be restrictive of the invention. The accompanying drawings are incorporated in and constitute a part of this application and, together with the description, serve to explain the principles of the invention in general terms. Like numerals refer to like parts throughout the disclosure.

BRIEF DESCRIPTION OF THE DRAWINGS

The objects, spirits and advantages of the preferred embodiments of the present invention will be readily understood by the accompanying drawings and detailed descriptions, wherein.

DETAILED DESCRIPTION OF THE PRESENT INVENTION

The characteristic of the monitoring device of the present invention is that users can easily acquire operation statuses of components arranged inside a computer visually and regulate the operation statuses using a regulation unit installed on a panel by an $I^2C$ bus to enable operation statuses of component arranged inside a computer to be displayed on the panel.

Figure 1:
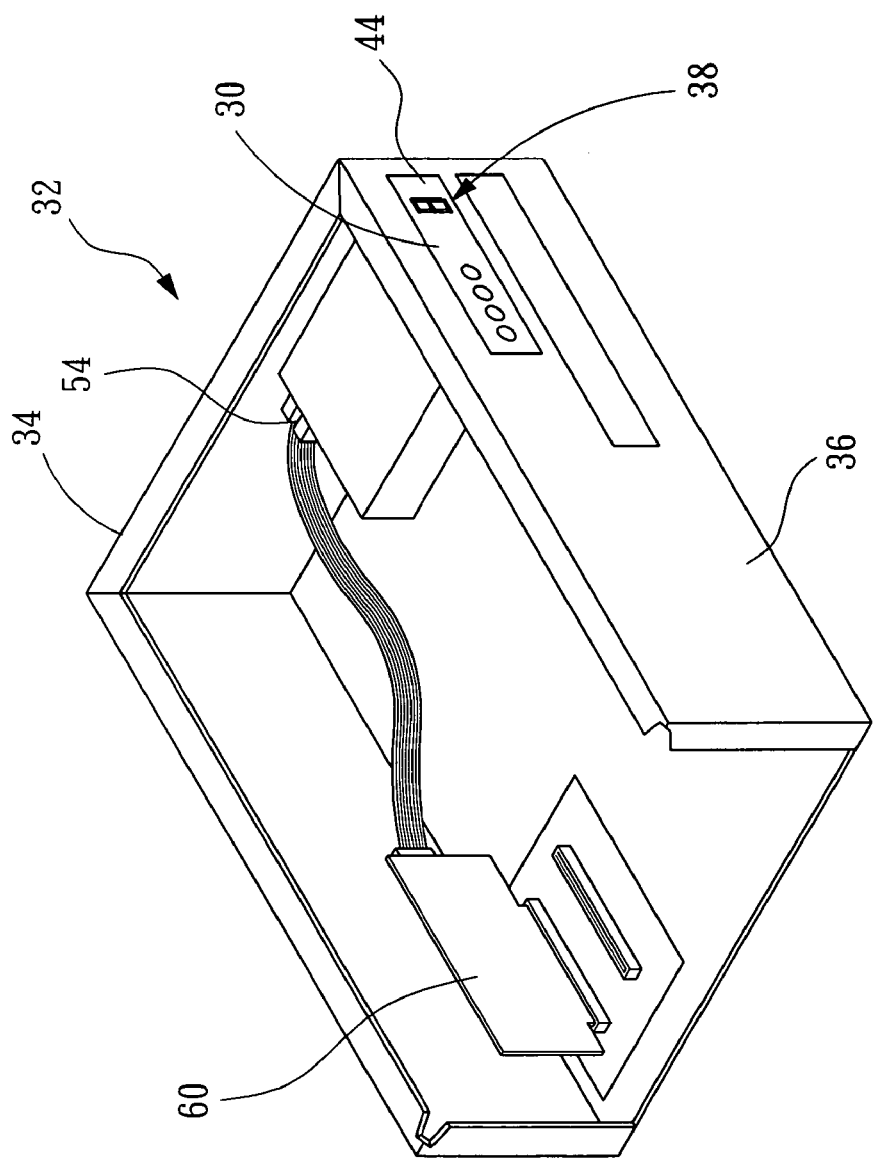
FIG. 1 is a drawing showing a monitoring device arranged in the recess of standard computer panel with reference to the R.O.C. Pat. 89123784.
Figure 2:
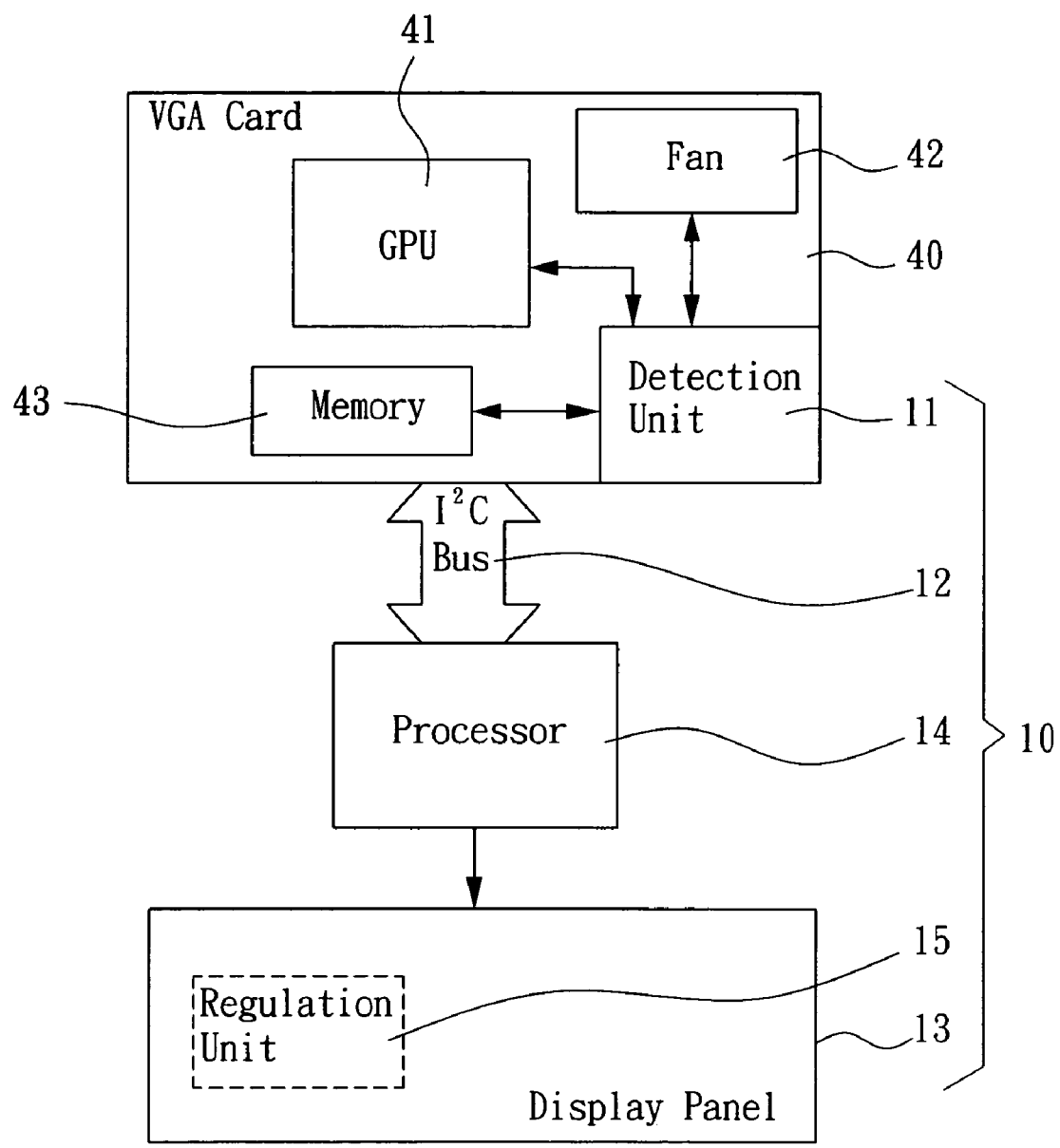
FIG. 2 and FIG. 3 are respectively a schematic diagram and a 3-D diagram showing a monitoring device applied between a computer and a video graphic array (VGA) card in accordance to the present invention.
Figure 3:
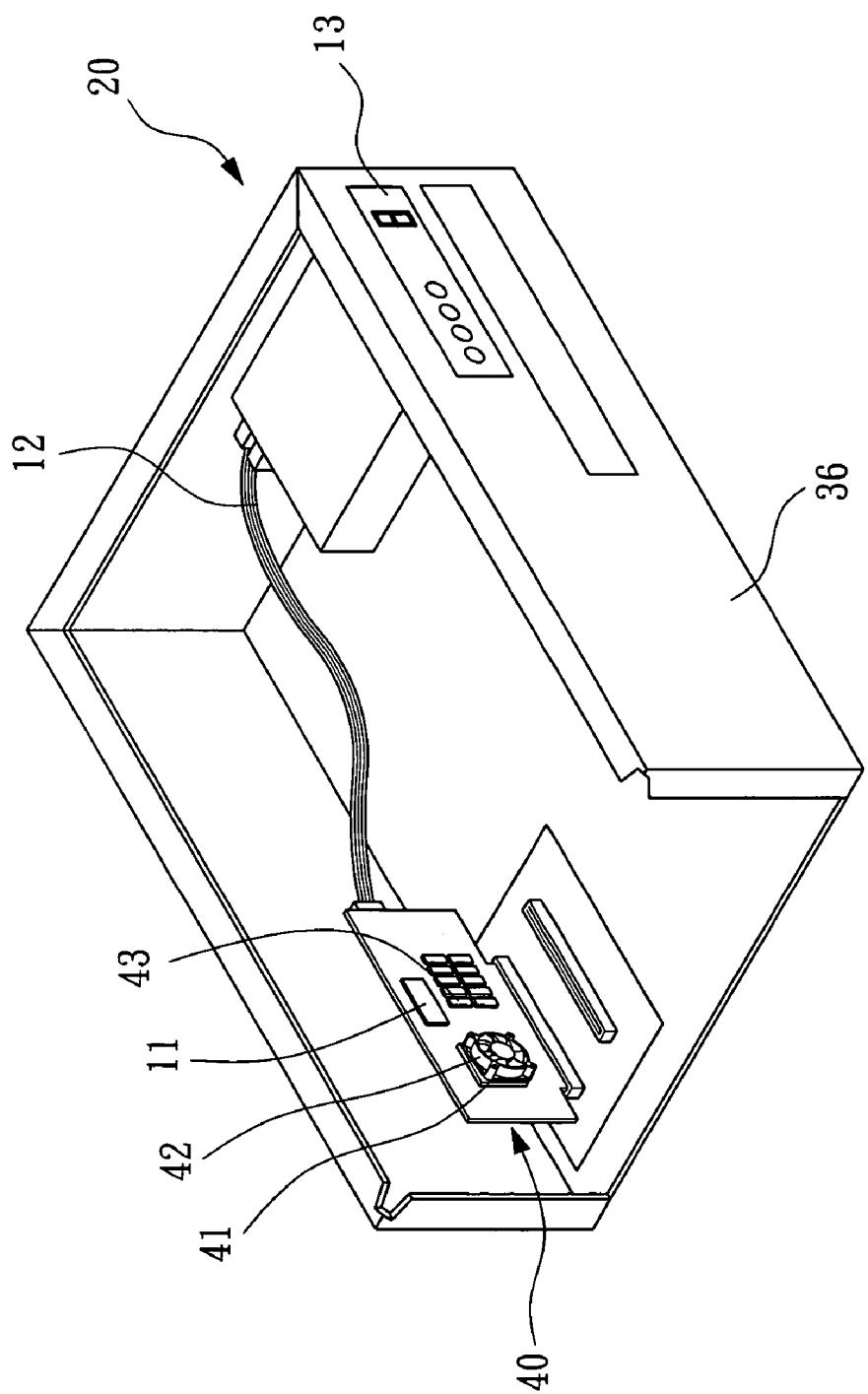

Please refer to FIG. 2 and FIG. 3, which are respectively a schematic diagram and a 3-D diagram showing a monitoring device applied between a computer and a video graphic array (VGA) card in accordance to the present invention. As shown, the monitoring device 10 comprises: a detection unit 11, an $I^2C$ bus 12, a display panel 13, a processor 14, and a regulation unit 15. The computer 20 has a shell 36, wherein the display panel 13 is arrange in the front of the shell 36 such that user is able to inspect the display panel 13 visually with ease. The VGA card 40 includes: a graphic processing unit (GPU) 41, a fan 42, a memory 43 and a detection unit 11, wherein, the temperature of the GPU 41 processing the intended graphic operations of the computer 20 will rise while operating in high frequency, thus, the fan 42 is installed in the GPU 41 for decreasing the temperature of the GPU 41; the detection unit 11 will detect the status of the GPU 41, such as the temperature of the GPU 41, the working voltage of the GPU 41, the working frequency of the GPU 41, the rotation speed of the fan 43, etc., and thereby store the detected information into the memory 43; the display panel 13 is a liquid crystal display panel capable of displaying the hardware status information of the VGA card 40 arranged inside the computer, such as the temperature of the GPU 41, the working voltage of the GPU 41, the working frequency of the GPU 41, and the rotation speed of the fan 42; the I$^2$C bus 12 is coupled between the detection unit 11 and the processor 14; the processor 14 will fetch the information stored in the memory 43 through the I$^2$C bus 12.

The regulation unit 15 arranged on the display panel 13 further comprises a knob that users can adjust the working frequency of the GPU 41 using the knob.

When the monitoring device 10 is activated, the regulation device will issue a control signal to the processor 14 which will define a critical range of temperature, working voltage, and working frequency of the GPU 41 through the I$^2$C bus 12 after receiving the control signal, and further will detect the hardware status of the VGA card 40 and store the detected information into the memory 43. Therefore, the processor 14 will be able to fetch an actual hardware status (e.g. actual temperature, actual working voltage, and actual working frequency of the GPU) and will generate an alert signal if the fetched actual hardware status exceeds the critical range. In a preferred embodiment of the present invention, the alert signal is displayed on the display panel 13 along with an alarm that users can see or hear the alert signal, and in consequence detect the abnormal of the VGA card. For instance, when the GPU 41 is overheated, the detection unit 11 will show a overheating alert on the display panel 13 to remind the user, and therefore the user will manually raise the rotation speed of the fan 42 or the rotation speed of the fan 42 will be raised automatically according to a predefine range of rotation speed so as to lower the temperature of the GPU 41.

In another preferred embodiment of the present invention, users can apply the knob of the regulation unit 15 for directly setting up the frequency of the GPU 41 form external. When the knob is turned by a user, the regulation unit 15 will issue a first control signal to the processor 14, and after the first control signal is received by the processor 14, the processor 14 will issue and a second control signal to the detection unit 11 through the I$^2$C bus 12 for regulating the frequency of the VGA card so as to achieve the objective of over clocking.

Figure 4:
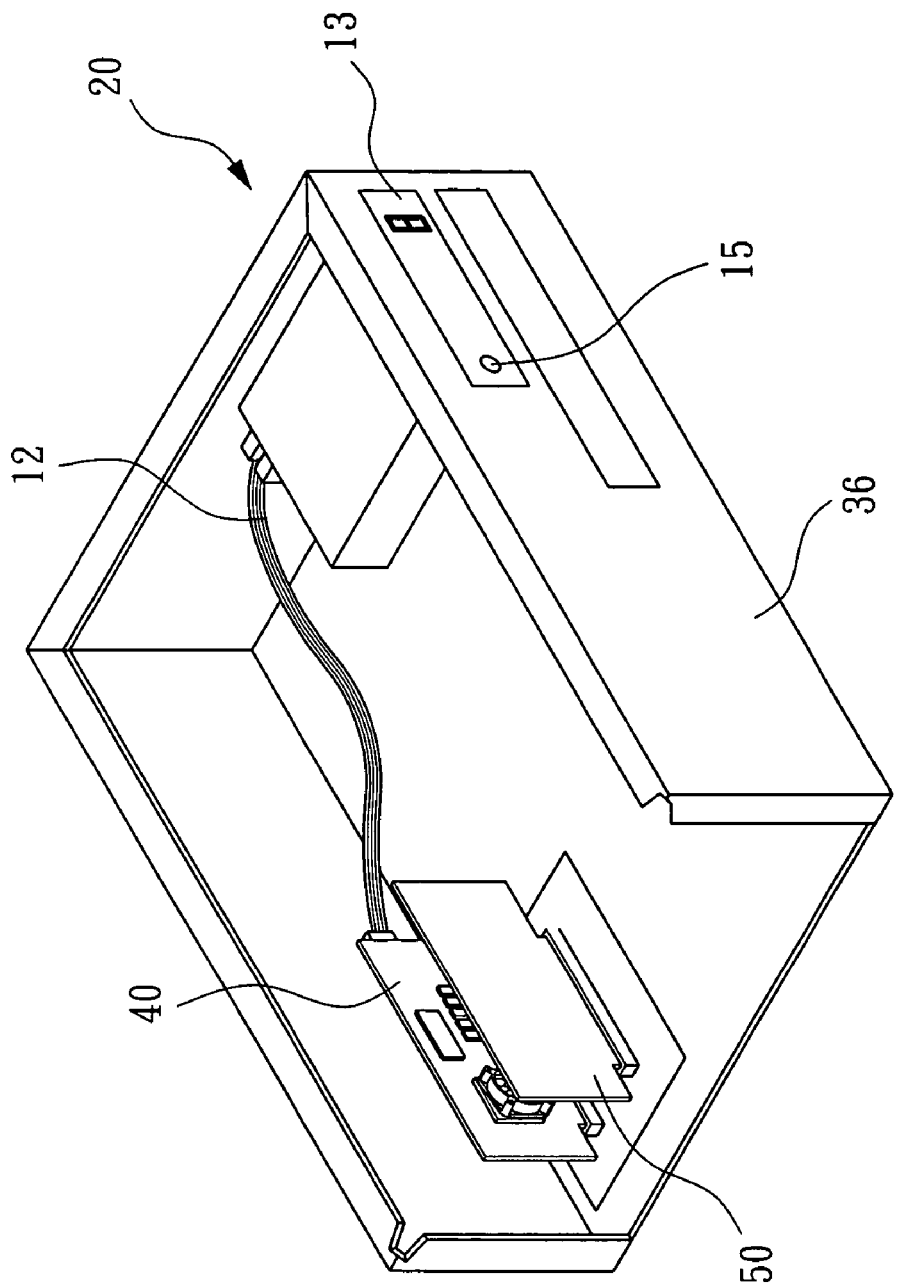
FIG. 4 is a diagram showing another preferred embodiment of the monitoring device according to the present invention.

In an embodiment of the present invention (as shown in FIG. 4), a computer installed with a TV tuner card is able to detect and store the information of TV channel and FM channel that are tuned and set by the TV tuner card into the memory 43 using the detection unit 11 arranged in the VGA card, thus, the processor 14 can fetch the information stored in the memory 43 through the I$^2$C bus 12 and display thereof on the display panel 13.

Figure 5:
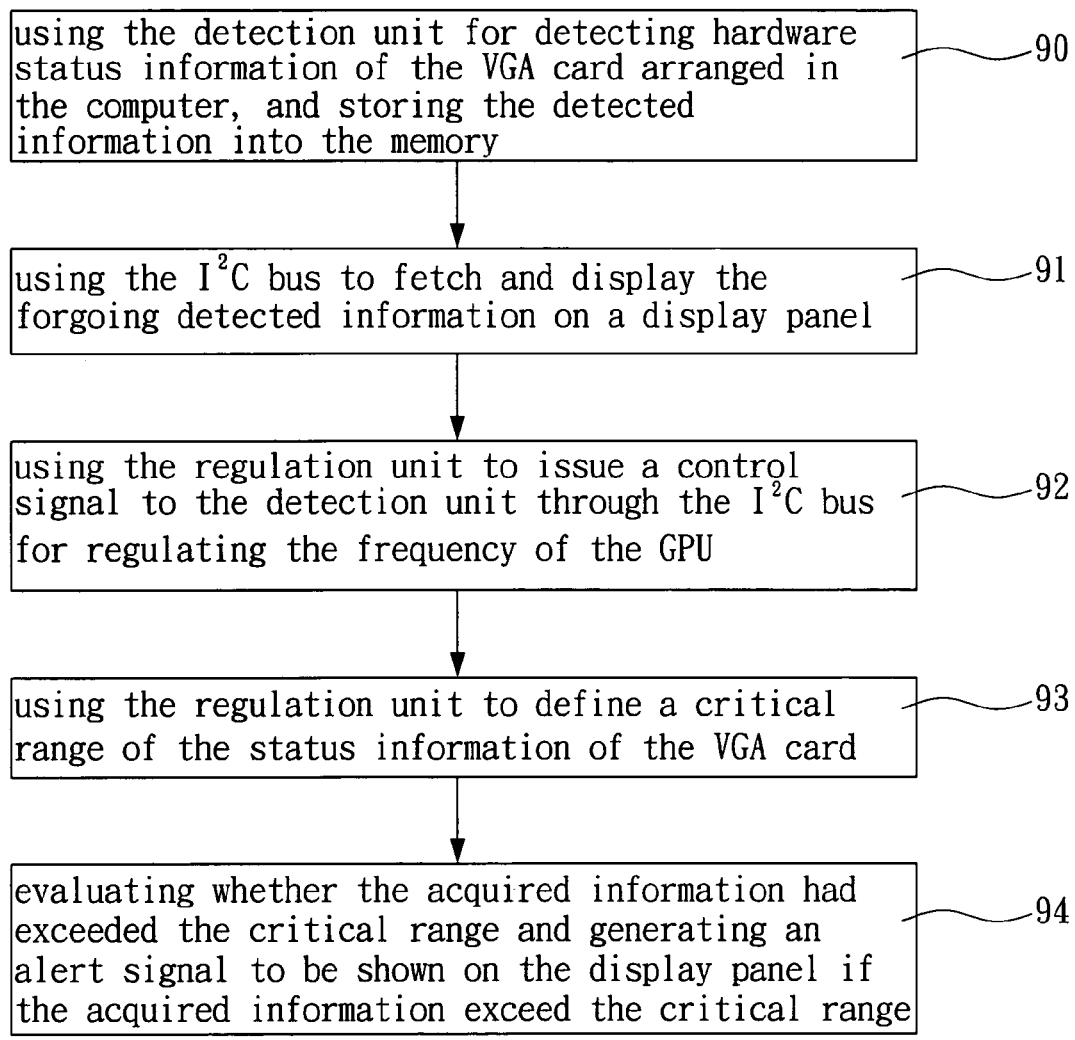
FIG. 5 is a preferred embodiment depicting the monitoring method of the present invention.

Please refer to FIG. 5, which is a preferred embodiment depicting the monitoring method of the present invention. The method is exercised using the aforesaid monitoring device 10, comprising the steps of:

step 90: using the detection unit 11 for detecting hardware status information of the VGA card 40 arranged in the computer 20, such as the temperature of the GPU 41, the working voltage of the GPU 41, the working frequency of the GPU 41, the rotation speed of the fan 42, and storing the detected information into the memory 43;

step 91: using the I$^2$C bus 12 to fetch and display the forgoing detected information on a display panel 13;

step 92: using the regulation unit 15 to issue a control signal to the detection unit 11 through the I$^2$C bus 12 for regulating the frequency of the GPU 41;

step 93: using the regulation unit 15 to define a critical range of the status information of the VGA card 40; and step 94: evaluating whether the acquired information had exceeded the critical range and generating an alert signal to be shown on the display panel if the acquired information exceed the critical range.

wherein, the I$^2$C bus 12 is a serial bus having two data lines, i.e. data line for system clock and data line for system data, that are employed as the bus for communicating data between ICs.

Figure 6:
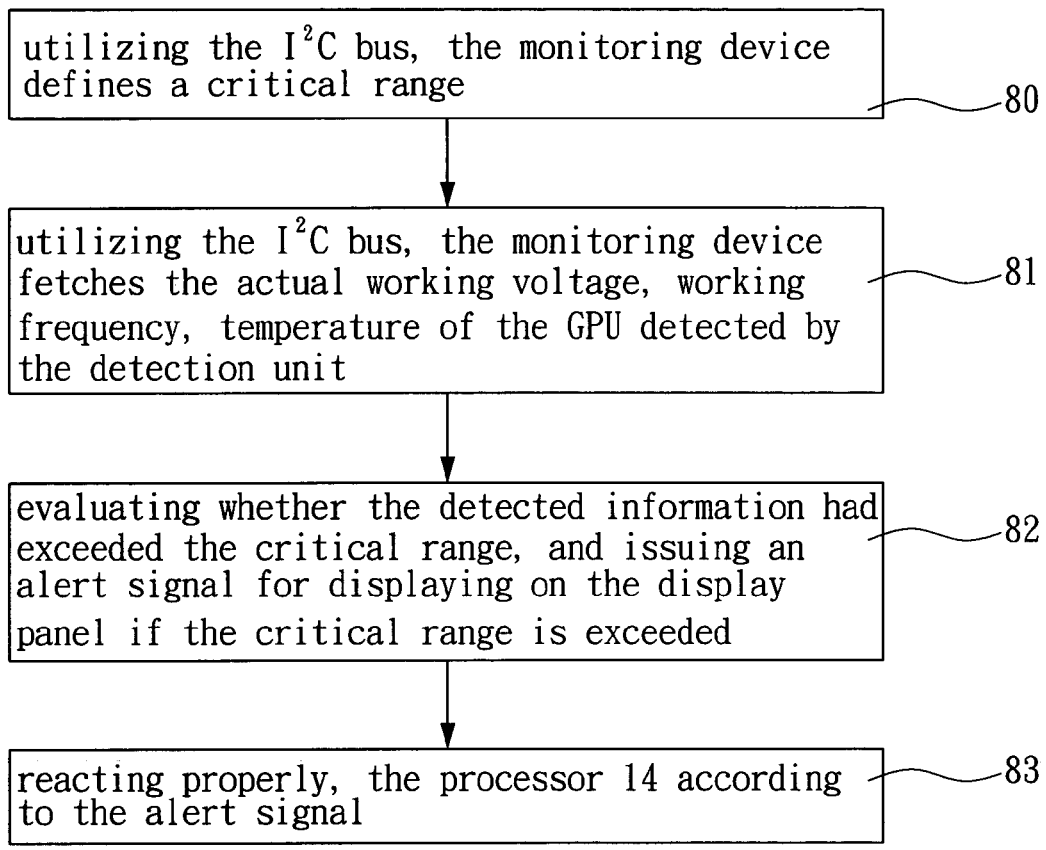
FIG. 6 is another preferred embodiment depicting the monitoring method of the present invention.

Please refer to FIG. 6, which is another preferred embodiment depicting the monitoring method of the present invention. The method comprises the steps of:

step 80: utilizing the I$^2$C bus 12, the monitoring device 10 defines a critical range, such as the temperature of the GPU 41, the working voltage of the GPU 41, the working frequency of the GPU 41, the rotation speed of the fan 42;

step 81: utilizing the I$^2$C bus 12, the monitoring device 10 fetches the actual working voltage, working frequency, temperature of the GPU 41 detected by the detection unit;

step 82: evaluating whether the detected information had exceeded the critical range, and issuing an alert signal for displaying on the display panel if the critical range is exceeded;

step 83: reacting properly, the processor 14 according to the alert signal, for instance, when the working voltage of the GPU 41 is too high or too low, the processor 14 will control the detection unit 14 through the I$^2$C bus 12 to regulate the working voltage; when the temperature of the GPU 41 is too high, the processor 14 will control the detection unit 14 through the I$^2$C bus 12 to raise the rotation speed of the fan 42 so as to lower the temperature.

Cooperating a VGA card with the method of the present invention is just one of the embodiments. The method of the present invention is capable of cooperating with other apparatus, such a chip on the motherboard, other kinds of hardware or firmware, or even software.

While the present invention has been shown and described with reference to a preferred embodiment thereof, and in terms of the illustrative drawings, it should be not considered as limited thereby. Various possible modification, omission, and alterations could be conceived of by one skilled in the art to the form and the content of any particular embodiment, without departing from the scope and the spirit of the present invention.

What is claimed is:

1. A device for monitoring a component arranged inside a computer, comprising:

a detection unit for detecting and acquiring an operation status data of the component arranged inside the computer;

an I$^2$C (Inter Integrated Circuit) bus coupled to the detection unit, for transmitting the data;

a display panel arranged on a shell of the computer, for displaying the data;

a processor used for receiving the data from the I$^2$C bus and displaying the data on the display panel; and a regulation unit capable of issuing a first control signal to the processor for requesting the operation status of the component arranged inside the computer to be regulated, wherein the processor regulates the component arranged inside the computer by issuing a second control signal through the I$^2$C bus.

2. The device of claim 1, wherein the regulation unit is arranged on the display panel.

3. The device of claim 1, wherein the regulation unit is further capable of issuing a third control signal to the processor for setting a critical range of the data.

4. The device of claim 3, wherein an alert signal will be generated by the processor when the processor determines that the data exceeds the critical range.

5. The device of claim 1, wherein the component arranged inside the computer is a video graphic adapter (VGA) card, the VGA card comprising a graphic processing unit (GPU), a fan, and a memory, such that the data includes a rotation speed of the fan, a working voltage and a working frequency of the memory, and a temperature, a working voltage, and a working frequency of the GPU.

6. The device of claim 1, wherein the component arranged inside the computer is a TV tuner card, such that the data includes a TV channel and a FM channel.

7. A method for monitoring a component arranged inside a computer, comprising steps of:

using a detection unit for detecting and acquiring operation status data of the component inside the computer;

using an I$^2$C bus for transmitting the data to a display panel arranged at a shell of the computer;

using a regulation unit arranged on the display panel to issue a control signal to the detection unit through the I$^2$C bus for regulating the operation status of the component inside the computer;

using the regulation unit to define a critical range of the data;

generating an alert signal if the data had exceed the critical range.

8. The method of claim 7, wherein the component arranged inside the computer is video graphic adapter (VGA) card, the VGA card comprising a graphic processing unit (GPU), a fan, and a memory, such that the data includes a rotation speed of the fan, a working voltage and a working frequency of the memory, and a temperature, a working voltage, and a working frequency of the GPU.

9. The method of claim 7, wherein the component arranged inside the computer is a TV tuner card, such that the data includes a TV channel and a FM channel.

10. The method of claim 7, wherein the alert signal is shown on the display panel.

11. The method of claim 7, wherein the alert signal is a audio signal.

* * * * *